March 17, 1931.   O. F. BOWERS   1,796,860
ROTIFER STABILIZING WING
Filed Aug. 5, 1929   2 Sheets-Sheet 2
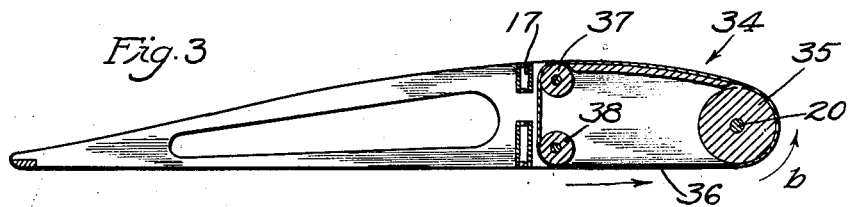
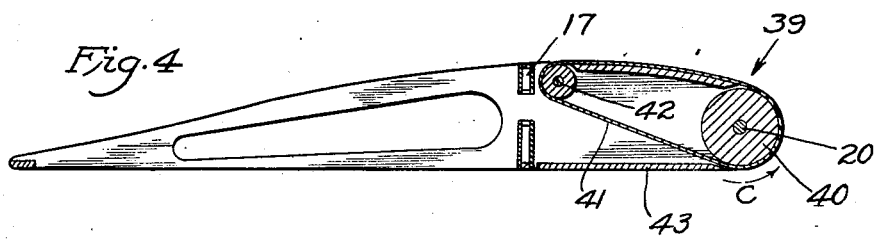
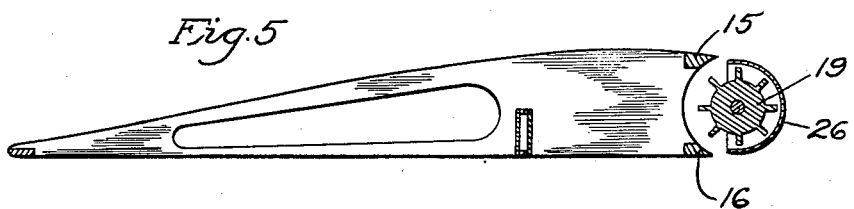
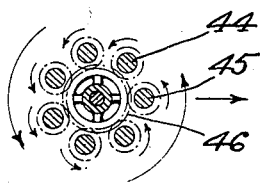
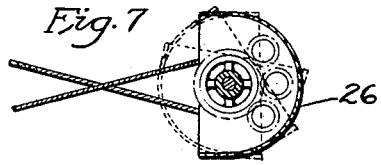
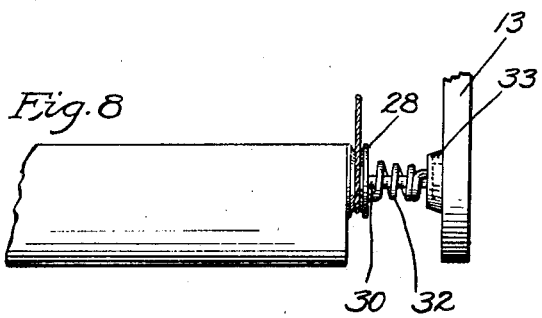
Inventor
Ora F. Bowers
By Townsend, Loftus & Abbett.
Attorneys Patented Mar. 17, 1931

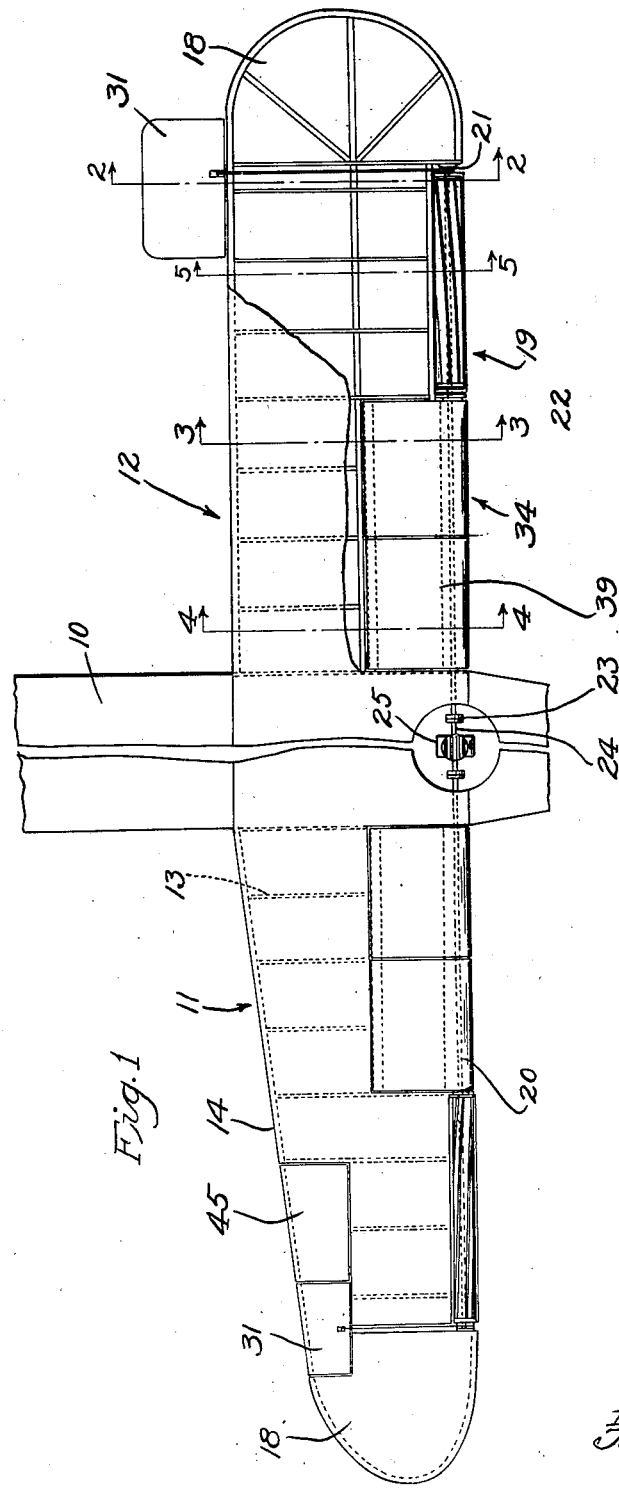

1,796,860

UNITED STATES PATENT OFFICE

ORA F. BOWERS, OF LOS ANGELES, CALIFORNIA, ASSIGNOR TO AERONAUTICAL DEVICES INCORPORATED, LTD., A CORPORATION OF NEVADA

ROTIFER STABILIZING WING

Application filed August 5, 1929. Serial No. 383,587.

This invention relates to airplane construction and particularly pertains to a rotifer stabilizing wing structure.

At the present time those engaged in aeronautical design are attempting to achieve a maximum safety in the flying performance of airplanes, giving particular thought to the stability of the plane and its capabilities of maintaining uniform longitudinal and lateral stability by automatic means whereby a desired safe angle of incidence may be constantly maintained, even during periods of blind flying, and it is the principal object of the present invention to provide automatic means incorporated within the wing structure of an airplane, and by which longitudinal and lateral stability of the plane may be optionally or automatically maintained.

The present invention contemplates the construction of an airplane wing structure having means disposed along the leading edge of the wing acting to increase the low pressure area occurring above the wing in flight, and thus increasing the lift of the wing, and which means may be automatically controlled by suitable ailerons pivotedly mounted to the trailing edge of the wing and operating a shutter which will vary the effective action of the lifting means disposed along the leading edge of the wing, and in inverse ratio to variation in air pressure acting against underface of the aileron. The structure further contemplates the provision of means disposed along the leading edge of the wing and which act to overcome the air resistance and to sustain the wing in flight with a minimum disturbance of the air along the entering edge of the wing and a minimum friction of the air upon the wing surface.

The invention is illustrated by way of example in the accompanying drawings, in which:

Figure 1 is a fragmentary view in plan showing an airplane wing structure and indicating the opposite halves of the wing as being of slight variation in design, but as embodying the invention with which the present application is concerned.

Fig. 2 is an enlarged sectional view through the wing as seen on the line 2—2 of Fig. 1, particularly showing the automatic stabilizing structure.

Fig. 3 is a view in transverse section through Fig. 1 of the drawings as seen on the line 4—4 and as showing means for increasing the load sustaining properties of the plane and for preventing ground collision.

Fig. 4 is an enlarged transverse section through the wing as seen on the line 3—3 of Fig. 1 and as showing the traction means for producing high speed and the lifting action of the plane through the medium of a moving wing element.

Fig. 5 is a view in transverse section through the wing as seen on the line 5—5 of Fig. 1 and as showing the automatic lift mechanism with its shutter in its normally closed position.

Fig. 6 is an enlarged fragmentary view in section showing a modified form of the rotary lift member disclosed in Fig. 5.

Fig. 7 is a fragmentary view in section in elevation showing another form of the rotary lifting member.

Fig. 8 is a fragmentary view in plan showing the shutter mounting.

Referring more particularly to the drawings 10 indicates the fuselage of the plane carrying wing sections 11 and 12 for the sake of convenience in showing the invention, and without repetition, the wing sections 11 and 12 as they appear in Fig. 1 each represent one-half of the different wing embodying construction of the present invention. These wings are formed with the usual ribs 13 which may be suitably connected by cross members 14 along their trailing edge and by cross beams 15 and 16 along their entering edge. The ribs may also be tied together at points intermediate their entering and trailing edges by any suitable beams 17. It is to be understood that the wings are covered with any desired material as supported by the ribs and the various connected beams. In the form of wing shown at 11 in the drawing the trailing edge is disposed at an angle to the entering edge, thus causing the tip of the wing to be narrower than the width of the wing along the longitudinal center of the plane. In the form of the wing shown at 12 in the drawings the trailing and entering edges are parallel and terminate in raked ends. The present invention is particularly concerned with the construction of the entering edge of the plane and the parts associated therewith, and it is to be understood that while each half of the wing, as generally indicated at 11 and 12, may embody all of the features of the invention here disclosed, that it is also possible and within the scope of the present invention to eliminate one or more of the separate units of the invention without departing from the spirit thereof.

The principal problem solved by the present invention is to produce automatic longitudinal stability of the plane, and to cause the plane to right itself when its speed of travel has for some reason become reduced to a speed lower than a minimum determined safe speed for the plane, and at which time the angle of incidence of the plane will tend to swing downwardly to a degree less than parallel to the surface of the earth. The principal structure for obtaining automatic stability in the present invention comprises a lifting cyilnder 19 mounted on a shaft 20 and supported in bearings 21 and 22 along the entering edge of the plane and beginning at a point just inside of the raked tip. The shaft 20 extends longitudinally of the wing and is fitted with a drive member such as that known as the Bendix drive, in which a spring member is interposed between a driving and driven element, and which is generally indicated at 23 of the drawings. The other part of the driving element 23 is connected by shaft 24 to an auxiliary power unit 25 such as a small internal combustion engine or electric motor. This unit constantly operates and normally directly and continuously drives the shafts 20 at a constant pre-determined speed which might range from 250 to 500 R. P. M. The lifting cylinder 19 is formed with a plurality of longitudinal extending fins 25 which may be straight and extend parallel to the shaft 20, or may be given a slight pitch so that they extend spirally of the shaft and incline to the rear at the outer end thereof. The cylinder 19 rotates upwardly from the entering edge in the direction of the arrow "a" as shown in Fig. 2 and will thus increase the low pressure area which normally occurs above the wing and due to the stream line effects of the wing as a result of the advance of the entering edge therethrough. It is evident that it would not be desirable to cause the lifting cylinders 19 to be effective at all times since this would tend to increase the angle of incidence and incline the plane to its burbling point, and in order to render the lifting cylinders ineffective a semi-cylindrcal shutter 26 is mounted on the axis of the shaft 20 and normally covers the portion of the cylinder forming the entering edge of the wing. This will cause the entering edge of the wing to appear as a smooth rounded surface. An operating cable 27 passes around a pulley 28 on the shutter, and is connected with opposite aileron posts 29 and 30 which are secured to an aileron 31 pivoted at 32 to the trailing edge of the plane. In the form of the wing generally indicated at 11 of Fig. 1 the aileron 31 is shown as buried in the trailing edge of the wing and in the form of the invention shown in the wing section 12 of Fig. 1 the aileron is shown as extending rearwardly of the trailing edge. In either event the vertical swinging movement of the aileron has direct relation to the oscillating movement of the shutter. Under normal conditions the shutter is held closed and the aileron is held in longitudinal alignment with the wing by a coil spring 32 which is wound around the shaft 20 and connects at one end with the shutter structure. Its opposite end is fastened to an adjusting nut 33 carried upon the end rib 13 of the wing and whereby variable adjustment may be exerted upon the spring to insure that the shutter will only open when a predetermined minimum air pressure is acting against the aileron. This pressure will correspond with a desired speed of the plane in miles per hour. It is to be understood that the aileron 31 may be operated by the usual controlled mechanism in the cabin of the plane at such times as it is desirable to create additional lift for the wings as might be required under some emergencies. While the rotary lifting members 19 are shown as only extending for a portion of the length of the entering edge of the wing, it is understood that they might extend for the entire length of this edge if desired.

Mounted adjacent the inner end of the lifting rollers 19 is a traction unit 34 which comprises a roller 35 and an endless skin member 36. This structure is particularly shown in Fig. 3 of the drawings. The endless member 36 passes around rollers 37 and 38, which hold the member in a path of travel substantially agreeing with the sectional contour of a portion or all of a wing. In Fig. 3 of the drawings this member is only shown as extending to the beam 17, but it is understood that it may extend to any point rearwardly thereof. The roller 35 is mounted upon the shaft 20 previously described, and continually rotates in the direction of the arrow "b" as indicated in Fig. 3. This causes the lower length of the endless member 36 to advance upon the supporting body of air. This is of particular value when the plane, through intention or inadvertence, may too closely approach the earth in a downwardly inclined path of travel, at which time the traveling member 36 will strike the compressed bank of air beneath the wing and tend to advance the plane upon this bank, and straighten the plane to travel along a path parallel to the earth's surface, thus avoiding accident. This particular form of device also increases the low sustaining action of the plane.

Disposed between the traction unit 34 and the fuselage of the plane is a propeller unit 39, as particularly shown in Fig. 4 of the drawings. This unit includes a roller 40 keyed upon the shaft 20 and driven thereby in the direction of the arrow "c". It is understood that the sectional contour of both rollers 35 and 40 agrees with the desired contour of the entering edge of a wing. Extending around the roller 40 is an endless skin member 41 which is exposed and forms a continuation of the upper contour of the wing surface for a desired distance rearwardly of the entering edge of the wing, at which point it passes around a roller 42. The under portion of the endless member 41 is concealed within a cap strip 43 so that this portion will be ineffective. With this structure increased speed may be obtained and some of the resistance of the entering edge of the wing will be eliminated so that the device will act as a propeller. It will also be evident that the upward and rearward movement of the endless member 41 during its travel will increase the low pressure area above the wing and thereby increase its lift.

In the forms of the invention shown in Figs. 6 and 7, of the drawings, modifications of the lifting roller 19 are disclosed. These modifications include a plurality of separate lifting rollers 44 carrying gears 45 and operating around a central gear 46 in a planetary motion. In this construction each of the rollers will act as a separate lifting element and will rotate in the direction indicated by the several arrows. In the form of the invention shown in Fig. 7, of the drawings, a series of rollers are mounted on the permanent bearings but are capable of independent support. These rollers may be separately or collectively rendered effective by the swinging of the shutter 26, as previously described, and as indicated by dotted lines in Fig. 7.

In operation of the present invention, and particularly the lifting rollers 19, it will be understood that the engine 25 is constantly rotating at a uniform rate of speed, and in a manner to drive the shafts 20 as indicated by the various arrows in the drawings. The springs 32 are set for a desired air pressure upon the underface of the ailerons 31, with the shutters 26 closed at this pressure the airplane then takes flight, at a speed above that which would create a wind pressure greater than the minimum for which the ailerons 31 are set. The shutters 26 will remain closed, and if any desired maneuvers may be carried out in the plane it will be understood that the plane may also be fitted with the usual ailerons 45, by which change in the lateral alignment of the plane may be effected, and that a suitable stabilizer, rudder and elevator not shown in the drawings is carried at the rear of the fuselage for controlling movement around the normal and lateral axis of the plane. When the speed of travel of the plane decreases to a point below the pre-determined minimum air pressure for the aileron 31, the tension of springs 32 will act to simultaneously swing the aileron 31 downwardly in the direction of the arrow "d" as indicated in Fig. 2, will simultaneously swing the shutter 26 outwardly and downwardly to an open position where the ribs of the lifting roller 19 will engage there and divert it upwardly and rearwardly over the wing to increase the low pressure area and resultant lift. Attention is directed to the fact that due to the spiral arrangement of the ribs of roller 19 the air will tend to be thrown off from the tip of the wing in a desirable manner and without creating any undue drag at this point.

It is also to be pointed out that in the event the airplane goes into a sideslip and the shutter opens the air through which the roller 19 is traveling longitudinally will act against the inclined face of the ribs on the roller 19 tending to rotate these ribs even though the power unit 25 has become inoperative, and will act to lift the wing tip and produce lateral stability of the plane.

When the plane travels toward the ground and reaches an area of air compression the traction unit 36 will strike this bank of air and tend to carry the plane along on top of the bank due to the frictional engagement of the endless skin member 36 in contact with the bank of air.

Under all conditions the unit 39 will act to increase the speed in the lift of the plane and to overcome air resistance against the entering edge of the wing.

It will thus be seen that the structure here disclosed provides simple and effective means for increasing the efficient operation of an airplane and automatically maintaining its stability and safety.

While I have shown the preferred form of my invention as now known to me, it will be understood that various changes may be made in the combination, construction and arrangement of parts by those skilled in the art, without departing from the spirit of the invention as claimed.

Having thus described my invention, what I claim and desire to secure by Letters Patent is:

1. A wing for aircraft having a vertically revolving entering edge, means normally shielding the same and means controlled by air pressure variations to move the shield to a non-shielding position.

2. A wing for aircraft having a cylindrical member extending longitudinally thereof and forming the entering edge therefor, means driving the same in an upwardly and rearwardly direction of rotation, a shield adapted to swing over the cylindrical member to render it ineffective, and means effected by a lowering of pressure of the air thru which the wing is traveling to actuate the shield and render the cylindrical member effective to increase the low pressure area above the wing.

3. A wing for aircraft having a cylindrical member extending longitudinally thereof and forming the entering edge therefor, means driving the same in an upwardly and rearwardly direction of rotation, a shield adapted to swing over the cylindrical member to render it ineffective, an aileron carried by the wing and extending in the plane of the wing at a determined air pressure, and means whereby a lowered air pressure will move the aileron to swing the shield to a non-obstructing position with relation to the cylindrical member.

4. A wing for aircraft having a cylindrical member nested in the leading edge thereof, a plurality of radial blades extending the length of said cylindrical member, means to rotate said cylindrical member, and means to predeterminedly present or remove said member from atmosphere action.

5. A wing for aircraft having a cylindrical member nested in the leading edge thereof, a plurality of radial blades extending the length of said cylindrical member, means to rotate said cylindrical member, an oscillatable shield to cover said cylindrical member, and means responsive to aileron manipulation to oscillate said shield to open or closed position.

6. A wing for aircraft having a rotatable cylindrical member nested in the leading edge thereof, said member having a plurality of helical blades extending radially and longitudinally of said member, means to rotate said member, an oscillatable shutter to cover said member, and means to move said shutter to cover or uncover said member in response to manipulation of an aileron.

7. A wing for aircraft having a rotatable cylindrical member nested in the leading edge thereof, said member having a plurality of helical blades extending radially and longitudinally of said member, said helical blades being so formed that that portion of the blade nearest the fuselage to which the wing is secured, will be rotationally in advance of the opposite end of the same blade, a movable shutter to cover said member, and means responsive to aileron movement to actuate said shutter to open or closed position.

8. In a lifting surface for aircraft, a cylindrical member nested in the leading edge of said surface, a plurality of blades extending radially and longitudinally of said member, a shutter to cover or uncover said member, means responsive to aileron manipulation to move said cover to uncovering position, and acquired energy means to close said shutter when said aileron is moved to its original position.

9. In a lifting surface for aircraft, a plurality of cylindrical members nested in the leading edge of said surface and adapted to planetary rotation around a common axis, an oscillatable shutter adapted to cover or uncover said members, and means responsive to aileron manipulation to cause said shutter to move to a position to cover or uncover said members.

ORA F. BOWERS.